United States Patent
Karikomi et al.

(10) Patent No.: US 6,756,758 B2
(45) Date of Patent: Jun. 29, 2004

(54) VIBRATION CONTROL APPARATUS FOR VEHICLE HAVING ELECTRIC MOTOR

(75) Inventors: Takaaki Karikomi, Kanagawa (JP); Ken Ito, Tokyo (JP)

(73) Assignee: Nissan Motor Co., Ltd., Kanagawa (JP)

(*) Notice: Subject to any disclaimer, the term of this patent is extended or adjusted under 35 U.S.C. 154(b) by 31 days.

(21) Appl. No.: 10/172,006

(22) Filed: Jun. 17, 2002

(65) Prior Publication Data

US 2002/0190683 A1 Dec. 19, 2002

(30) Foreign Application Priority Data

Jun. 18, 2001 (JP) ........................................ 2001-183519

(51) Int. Cl.$^7$ .............................................. H02P 7/00
(52) U.S. Cl. ........................ 318/434; 318/432; 318/52; 180/197
(58) Field of Search ................................ 318/432, 434, 318/448, 460, 52, 66, 68–71; 180/197, 65.1–65.8; 73/650

(56) References Cited

U.S. PATENT DOCUMENTS 4,614,248 A * 9/1986 Kakinami et al. .......... 318/434
5,841,254 A * 11/1998 Balch et al. ................ 318/430
6,163,121 A * 12/2000 Kumar et al. .............. 318/434

FOREIGN PATENT DOCUMENTS

| JP | 4-355688 | | 12/1992 | |
| JP | 06054415 A | * | 2/1994 | .......... B60L/15/20 |
| JP | P2000-217209 A | | 8/2000 | |
| JP | 2001-45613 | | 2/2001 | |
| JP | 2001045613 A | * | 2/2001 | .......... B60L/15/20 |

* cited by examiner

Primary Examiner—Robert Nappi
Assistant Examiner—Eduardo Colon Santana
(74) Attorney, Agent, or Firm—McDermott, Will & Emery

(57) ABSTRACT

In a vibration control apparatus for a vehicle driven by an electric motor at least, a first target torque is calculated from a vehicle operating condition such as an accelerator opening, and a second target torque is calculated from at least a sensed motor speed by using a model H(s)/Gp(s) composed of a transfer characteristic H(s) which is greater than or equal to a transfer characteristic Gp(s) in an order difference between the order of a denominator and the order of a numerator. A torque control section controls the motor to bring an actual output torque of the motor closer to a command motor torque determined from the first and second target torque.

15 Claims, 13 Drawing Sheets

VIBRATION CONTROL APPARATUS FOR VEHICLE HAVING ELECTRIC MOTOR

BACKGROUND OF THE INVENTION

The present invention relates to a vibration control apparatus for a vehicle having an electric motor, and more specifically to such a vibration control apparatus for restraining hunching in torque.

A Published Japanese Patent Application Kokai Publication No. 2001-45613 shows a vibration control apparatus for a vehicle driven by an electric motor.

SUMMARY OF THE INVENTION

It is an object of the present invention to provide vibration control apparatus and/or process capable of reducing vibrations reliably in a vehicle powered by an electric motor. Another object is to provide vibration control apparatus and/or process capable of reducing vibrations securely even in a situation in which an accelerator pedal is depressed from a stop state or a deceleration state.

According to one aspect of the present invention, a vibration control apparatus for a vehicle powered by an electric motor (6) comprises: (a) a motor speed sensor to sense an actual motor speed of the electric motor; (b) a first target torque setting section to set a first target torque in accordance with vehicle information on a vehicle operating condition; (c) a motor speed estimating section which includes a filter having a model Gp(s) of a transfer characteristic between a vehicle torque input and a motor speed, and which is arranged to receive a command motor torque and to calculate an estimated motor speed of the electric motor from the command motor torque with the filter; (d) a deviation calculating section determining an input quantity from a deviation of the actual motor speed from the estimated motor speed; (e) a second target torque setting section including a filter having a model H(s)/Gp(s) composed of a transfer characteristic H(s) which is greater than or equal to the model Gp(s) in an order difference between the order of a denominator and the order of a numerator, the second target torque setting section being arranged to receive the input quantity from the deviation calculating section and to calculate, as an output quantity, a second target torque from the input quantity with the filter having the model H(s)/Gp (s); (f) a command torque calculating section to calculate the command motor torque by addition of the first target torque and the second target torque, and to deliver the command motor torque to the motor speed estimating section; and (g) a motor torque controlling section to control the electric motor to bring an actual output torque of the electric motor closer to the command motor torque.

According to another aspect of the present invention, a vibration control apparatus for a vehicle powered by an electric motor comprises: a motor speed calculating section which includes a filter having a desired model Gm(s) of a transfer characteristic between a vehicle torque input and a motor speed, and which is arranged to receive a command motor torque and to calculate a desired motor speed of the electric motor from the command motor torque with the filter; a subtracting section determining a deviation of the actual motor speed from the estimated motor speed; and a second target torque setting section including a filter having a model H(s)/Gp(s) composed of a transfer characteristic H(s) which is greater than or equal to a transfer characteristic Gp(s) in an order difference between the order of a denominator and the order of a numerator, the second target torque setting section being arranged to receive the deviation from the subtracting section and to calculate a second target torque from the deviation with the filter having the model H(s)/Gp(s).

According to still another aspect of the present invention, a vibration control apparatus for a vehicle having a prime mover including an electric motor, the vibration control apparatus comprises: (a) first calculating means for calculating a first target torque in accordance with vehicle information on a vehicle operating condition; (b) second calculating means for calculating a second target torque in accordance with a sensed motor speed by using a torque determining model H(s)/Gp(s) composed of a transfer characteristic H(s) which is greater than a transfer characteristic Gp(s) in an order difference between the order of a denominator and the order of a numerator; (c) third calculating means for calculating a command motor torque from the first target torque and the second target torque; and (d) controlling means for controlling the electric motor to bring an actual output torque of the electric motor closer to the command motor torque.

According to still another aspect of the present invention, a vibration control process for a vehicle having a prime mover including an electric motor, the vibration control process comprises: (a) calculating a first target torque in accordance with vehicle information on a vehicle operating condition; (b) calculating a second target torque from a sensed motor speed of the electric motor, by using a model H(s)/Gp(s) composed of a transfer characteristic H(s) which is greater than or equal to a transfer characteristic Gp(s) in an order difference between the order of a denominator and the order of a numerator; and (c) calculating a command motor torque from the first target torque and the second target torque, to control the electric motor to bring an actual output torque of the electric motor closer to the command motor torque.

The other objects and features of this invention will become understood from the following description with reference to the accompanying drawings.

DETAILED DESCRIPTION OF THE INVENTION

Figure 1:
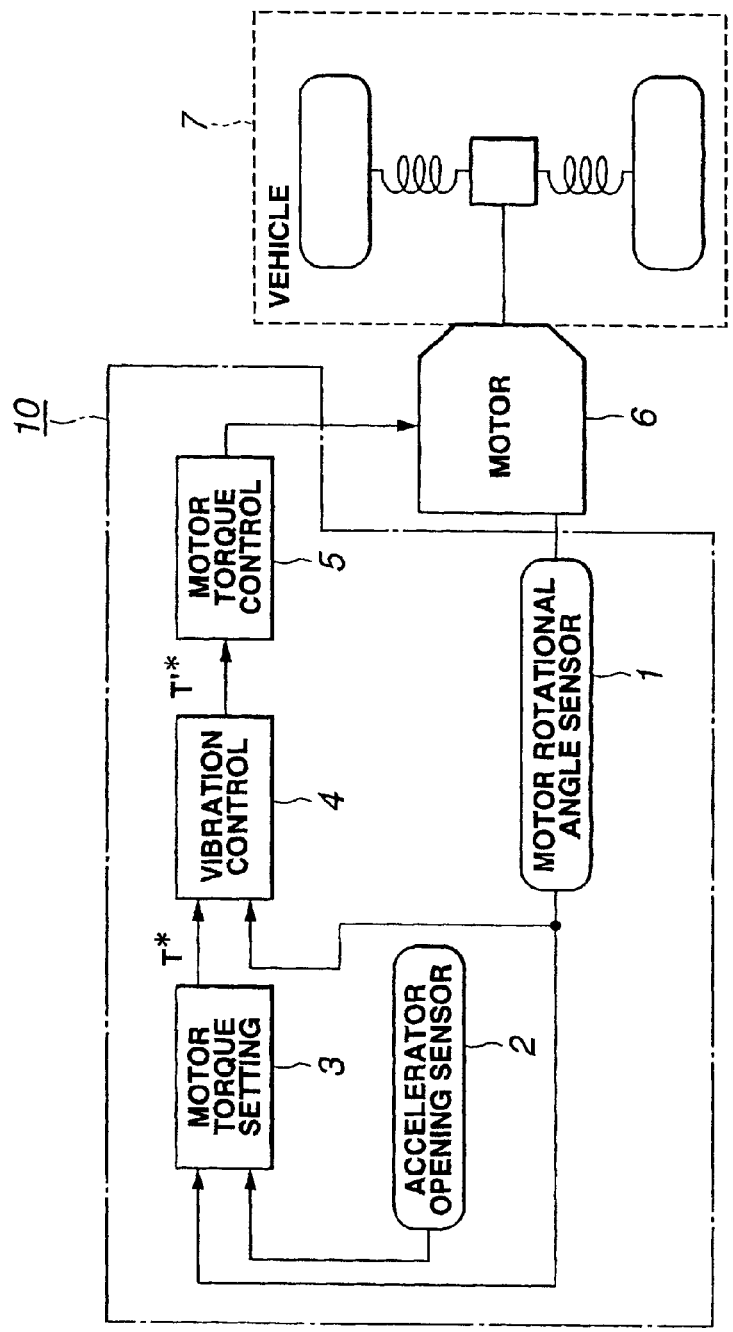
FIG. 1 is a schematic view showing a vibration control apparatus according to a first embodiment of the present invention.

FIG. 1 shows a vibration control apparatus according to a first embodiment of the present invention. A vibration control apparatus 10 is connected with a motor 6 for driving a vehicle 7. Vibration control apparatus 10 includes a motor rotational angle sensor (means for sensing a rotational speed of motor 6), and an accelerator opening sensor 2 for sensing an opening degree of an accelerator pedal of the vehicle (or driver's accelerator input).

Vibration control apparatus 10 further includes a motor torque setting section (means for setting a first target torque) 3 for setting a target motor torque (first target torque T*) in accordance with the accelerator opening sensed by accelerator opening sensor 2 and the motor speed sensed by motor angle sensor 1; a vibration control section 4; and a motor torque control section (means for controlling the motor torque) 5.

Vibration control section 4 receives the first target torque T* from motor torque setting section 3 and data on the motor angle sensed by motor angle sensor 1; calculates a command motor torque T'* in accordance with these input data items; and delivers command motor torque T'* to motor torque control section 5.

Motor torque control section 5 controls motor 6 so as to bring the output torque of motor 6 equal to command motor torque T'* dictated by vibration control section 4.

Figure 2:
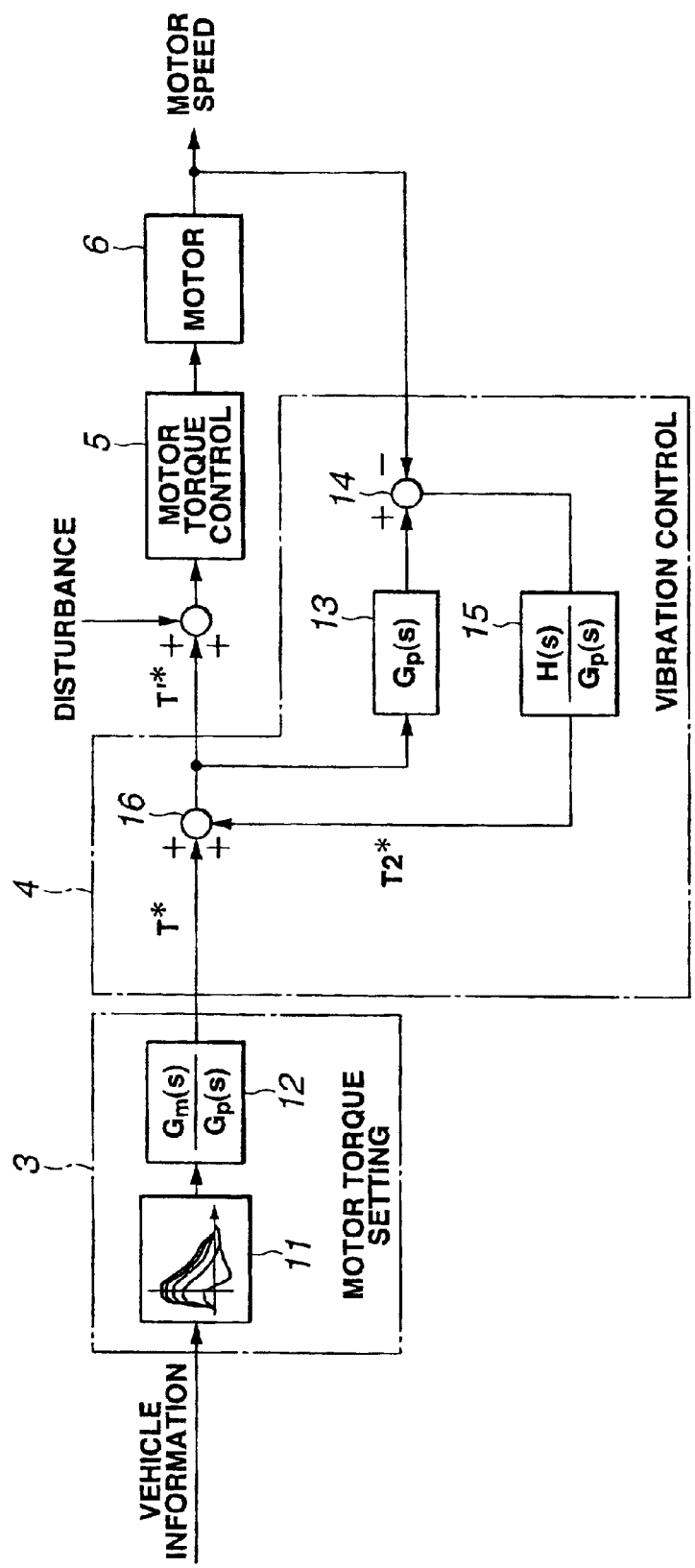
FIG. 2 is a block diagram showing a motor torque setting section and a vibration control section in the vibration control apparatus of FIG. 1.
Figure 3:
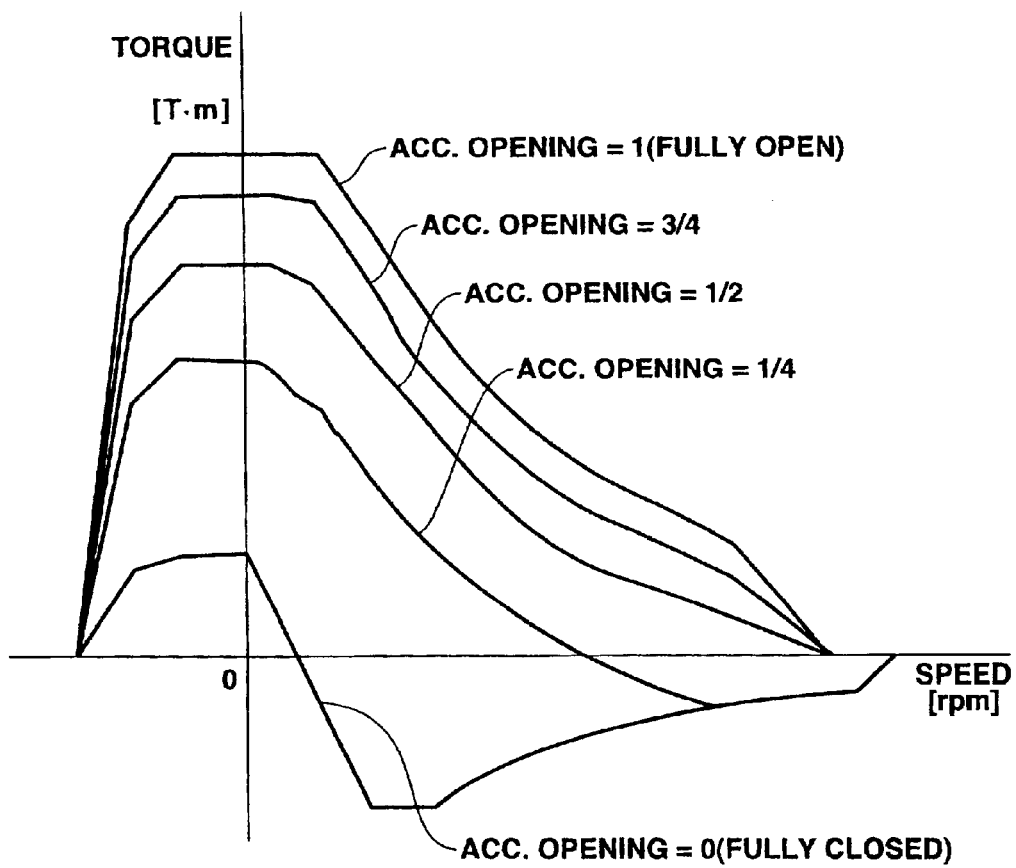
FIG. 3 is a graph showing a map of a relation among motor speed, accelerator opening and output torque, used in the vibration control apparatus of FIG. 1.

FIG. 2 shows more in detail motor torque setting section 3 and vibration control section 4 in the form of block diagram. Motor torque setting section 3 includes: a torque map (means for setting a steady target torque) 11 having a preset relation, for a plurality of accelerator opening values, between the speed of motor 6 and the output torque of motor 6, as shown in FIG. 3; and a control block (means for modifying the target torque) 12 having a transfer characteristic Gm(s)/Gp(s). In this transfer characteristic, Gp(s) is a model representing a transfer characteristic between a torque input to the vehicle and the motor rotational speed; and Gm(s) is a model (ideal model) representing a desired response of the torque input to the vehicle and motor rotational speed.

Vibration control section 4 includes: a control block (means for estimating a motor speed) 13 having the above-mentioned transfer characteristic Gp(s); a subtracter (subtracting means) 14 for calculating a deviation between the output of control block 13 and the motor rotational speed; a control block 15 for receiving the deviation determined by subtracter 14 as an input and producing a filter output with a transfer characteristic H(s)/Gp(s); and an adder (means for calculating a command motor torque) 16 for adding the output of control block 15 and first target torque T*. Transfer characteristic H(s) is so set that a difference between the order (or degree) of a denominator of H(s) and the order (or degree) of a numerator of H(s) is equal to or greater than a difference between the order (or degree) of a denominator of transfer characteristic Gp(s) and the order (or degree) of a numerator of Gp(s). In this example, subtracter 14 serves as a section to determine an input quantity to control block 15, and the input quantity is equal to the deviation of the actual motor speed from the estimated motor speed.

Figure 4:
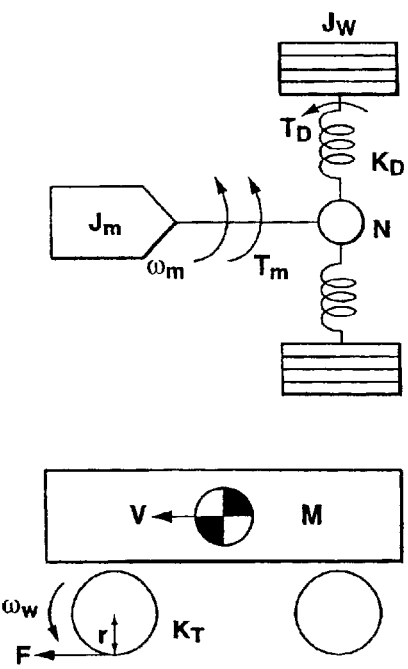
FIG. 4 is a schematic view for illustrating an equation of vehicle motion, used to determine a model in the vibration control apparatus of FIG. 1.

Model Gp(s) in the form of the transfer characteristic of the vehicle torque input and motor speed is given in the following manner. FIG. 4 is a schematic view for illustrating equation of motion of a driving torsional vibration system. The example of FIG. 4 employs the following notation.

Jm: Inertia of motor
Jw: Drive wheel inertia
M: Mass of vehicle
KD: Torsional rigidity of drive system
KT: Coefficient regarding friction between tire and road surface
N: Overall gear ratio
r: Tire loaded radius
ωm: Angular speed of motor
Tm: Torque of motor
TD: Drive wheel torque
F: Force applied on vehicle
V: Vehicle speed
ωw: Drive wheel angular speed From FIG. 4, the following equation of motion is obtained.

$$Jm \cdot \omega^*m = Tm - TD/N \tag{1}$$

$$2Jw \cdot \omega^*w = TD - rF \tag{2}$$

$$MV^* = F \tag{3}$$

$$TD = KD \int (\omega m/N - \omega w) dt \tag{4}$$

$$F = KT(r\omega w - V) \tag{5}$$

The asterisk * added to a reference represents time differentiation.

From these equations (1)~(5), the transfer characteristic Gp(s) from the motor torque to the motor speed is obtained as follows:

$$Gp(s) = (b_3 s^3 + b_2 s^2 + b_1 s + b_0)/s(a_4 s^3 + a_3 s^2 + a_2 s + a_1) \tag{6}$$

$$a_4 = 2Jm \cdot Jw \cdot M \tag{7}$$

$$a_3 = Jm(2Jw + Mr^2)KT \tag{8}$$

$$a_2 = (Jm + 2Jw/N^2)M \cdot KD \tag{9}$$

$$a_1 = (Jm + 2Jw/N^2 + Mr^2/N^2)KD \cdot KT \tag{10}$$

$$b_3 = 2Jw \cdot M \tag{11}$$

$$b_2=(2Jw+Mr^2)KT \quad (12)$$

$$b_1=M \cdot KD \quad (13)$$

$$b_0=KD \cdot KT \quad (14)$$

Examination of pole and zero point in the transfer characteristic expressed by equation (6) shows that one pole and one zero point assume values which are very close to other. This means that $\alpha$ and $\beta$ in the following equation (15) assume values very close to each other.

$$Gp(s)=(s+\beta)(b_2's^2+b_1's+b_0')/s(s+\alpha)(a_3's^2+a_2's+a_1') \quad (15)$$

Therefore, the transfer characteristic Gp(s) in the form of [second order]/[third order] as in the following equation (16) is obtained by pole zero cancellation (approximation of $\alpha=\beta$) in equation (15).

$$Gp(s)=(b_2's^2+b_1's+b_0')/s(a_3's^2+a_2's+a_1') \quad (16)$$

To implement equation (16) by microcomputer operations, in this example, Z transform and discretization are performed by using equation (17).

$$s=(2/T) \cdot \{(1-Z^{-1})/(1+Z^{-1})\} \quad (17)$$

Figure 5:
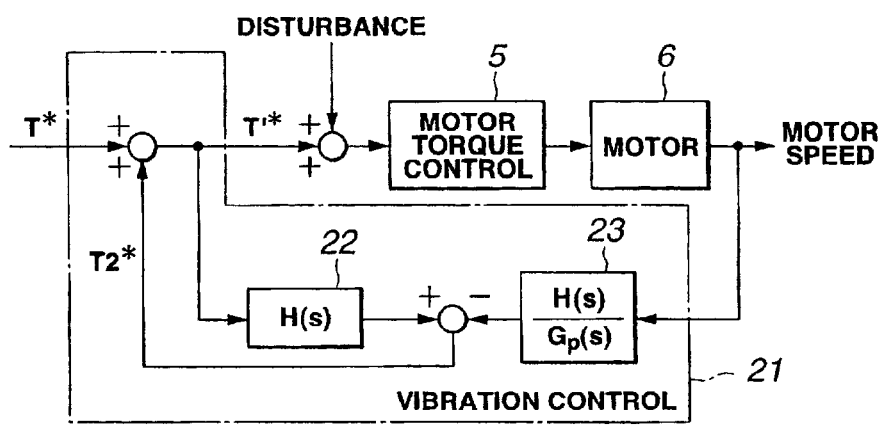
FIG. 5 is a block diagram of a vibration control section rearranged as an equivalent from the vibration control section of FIG. 2, so as to prevent drift.

The transfer characteristic Gp(s) expressed by equation (17) contains a genuine integral term. Therefore, vibration control section 4 of FIG. 2 is equivalent transformed to a vibration control section 21 as shown in FIG. 5. That is, vibration control section 4 is transformed into an arrangement including a control block 22 having a transfer characteristic H(s) and a control block 23 having a transfer characteristic H(s)/Gp(s). This arrangement helps prevent drift.

Figure 6:
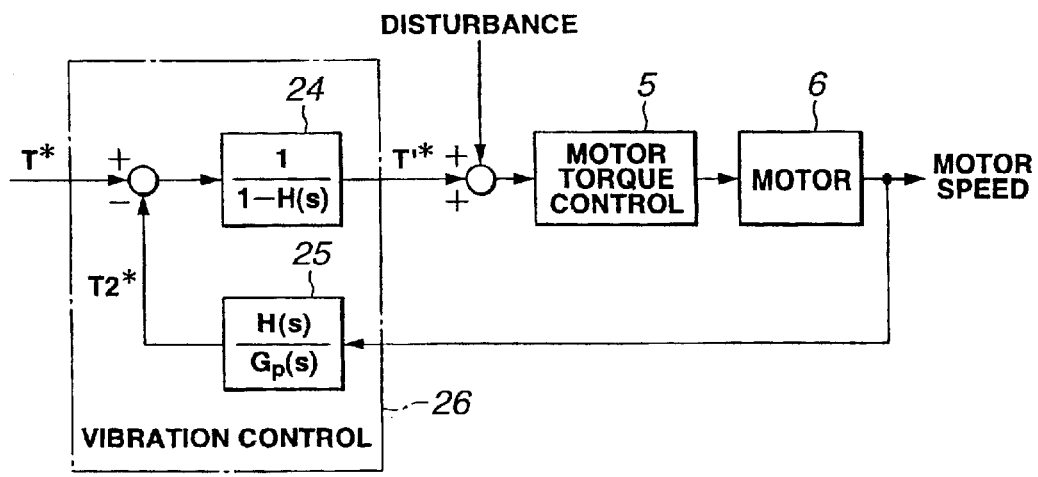
FIG. 6 is a block diagram of a vibration control section rearranged as an equivalent from the vibration control section of FIG. 2, so as to prevent control delay.

In vibration control sections 4 and 21 shown in FIGS. 2 and 5, there is formed an algebraic loop which requires dead time for discretization. However, the system of this embodiment can prevent control delay due to dead time by using a vibration control section 26 including a control block 24 having a transfer characteristic 1/(1−H(s)) and a control block 25 having a transfer characteristic H(s)/Gp(s), as shown in FIG. 6.

When the speed ratio of the vehicle is variable, this vibration control apparatus can provide accurate vibration control performance irrespective of changes in the speed ratio by varying each constant or parameter in transfer characteristic Gp(s) in dependence on the speed ratio.

Figure 7:
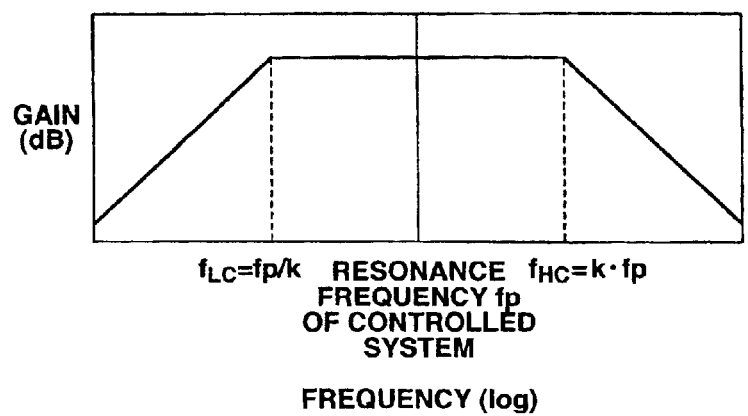
FIG. 7 is a graph showing a transfer characteristic H(s) used in the vibration control apparatus of FIG. 1.

Transfer characteristic H(s), when set as a band-pass filter, serves as a feedback element reducing only vibrations. In this case, the maximum effects can be achieved when the filter characteristic is set as shown in FIG. 7. In the characteristic of H(s) shown in FIG. 7, the damping characteristic is approximately equal between the low-pass side and the high-pass side, and the torsional resonance frequency of the drive system is set at or about the middle of the pass band on the logarithmic axis (log scale). For example, H(s) can be set as a first order high-pass filter as expressed by the following equation by using the torsional resonance frequency fp of the drive system and an arbitrary constant value k.

$$H(s)=\tau Hs/\{(1+\tau Hs) \cdot (1+\tau Ls)\} \quad (18)$$

where $\tau L=1/(2\pi fHC)$, $fHC=kfp$, $\tau H=1/(2\pi fLC)$ and $fLC=fp/k$.

The effect can be increased by increasing the constant k tough there is limitation of constant k to maintain the stability of the control system. In some cases, it is possible to set constant k to a value smaller than or equal to one. In the same manner as mentioned before, Z transformation and descritization are performed.

Figure 8A:
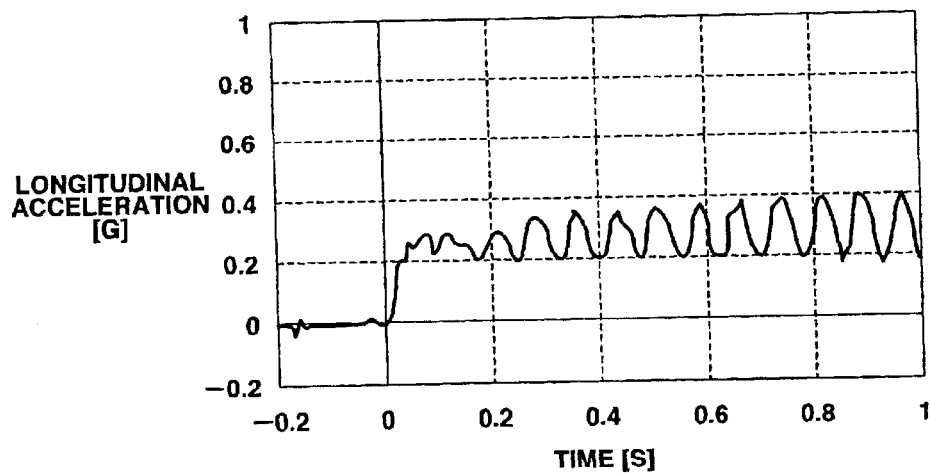
FIGS. 8A and 8B are graphs showing a step response of earlier technology and a step response obtained by the vibration control apparatus according to the first embodiment, respectively.
Figure 8B:
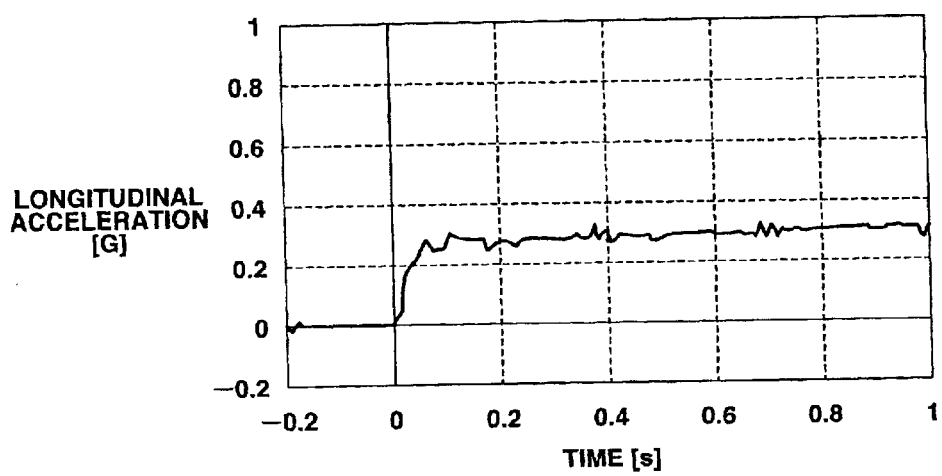

FIGS. 8A and 8B show variation of longitudinal acceleration (G) with respect to speed for comparison of vibration control between a control model of earlier technology and the control model according to this embodiment of the invention. As shown in FIG. 8B, the vibration control system using the control model according to this embodiment can reduce vibrations sufficiently in starting the vehicle, as compared to the results of the earlier technology shown in FIG. 8A. In order to remove a frequency component in torsional vibration causative of hunting produced with respect to a target torque of an electric motor, a vibration control system of earlier technology is arranged to add, to a map representing a relation between speed and torque, a filter having a transfer function Gm(s)/Gp(s) composed of a desired response Gm(s) and a characteristic Gp(s) of the controlled system. Thus, the vibration control system of earlier technology is arranged to suppress hunting in a creep operation of a vehicle, and moreover to enable smooth acceleration of the vehicle by realizing a sharp torque rise in response to driver's accelerator operation.

However, the element Gm(s)/Gp(s) functions as a feed forward compensator in torque control, so that the vibration control effect (to reduce hunting) tends to be insufficient due to influence of looseness in a gear system in a situation in which an accelerator pedal is depressed in a vehicle rest state or vehicle deceleration state. By contrast, the vibration control apparatus according to the first embodiment can reduce vibrations sufficiently in acceleration from the rest state or deceleration state.

Vibration control apparatus 10 according to the first embodiment functions to detect vibrations due to disturbance torque and unmatch of vehicle model and cancel the vibrations by feedback compensation. Therefore, the vibration control performance is sufficient even in the rest state of the vehicle, and in accelerating operation caused by depression of the accelerator pedal during deceleration. Moreover, this system can reduce vibrations even when torsional vibrations are excited by an external factor.

Figure 9:
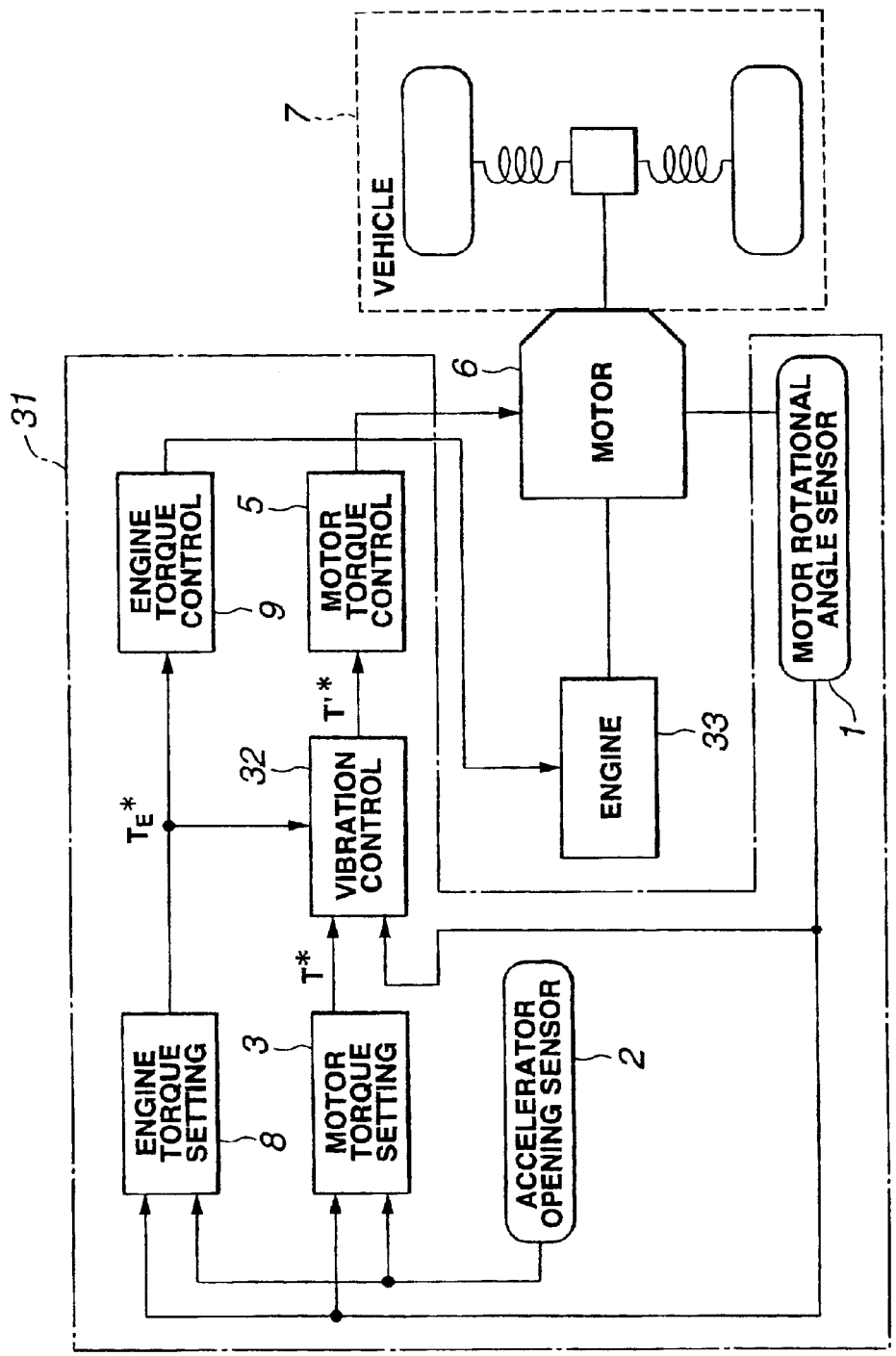
FIG. 9 is a schematic view showing a vibration control apparatus according to a second embodiment of the present invention.
Figure 10:
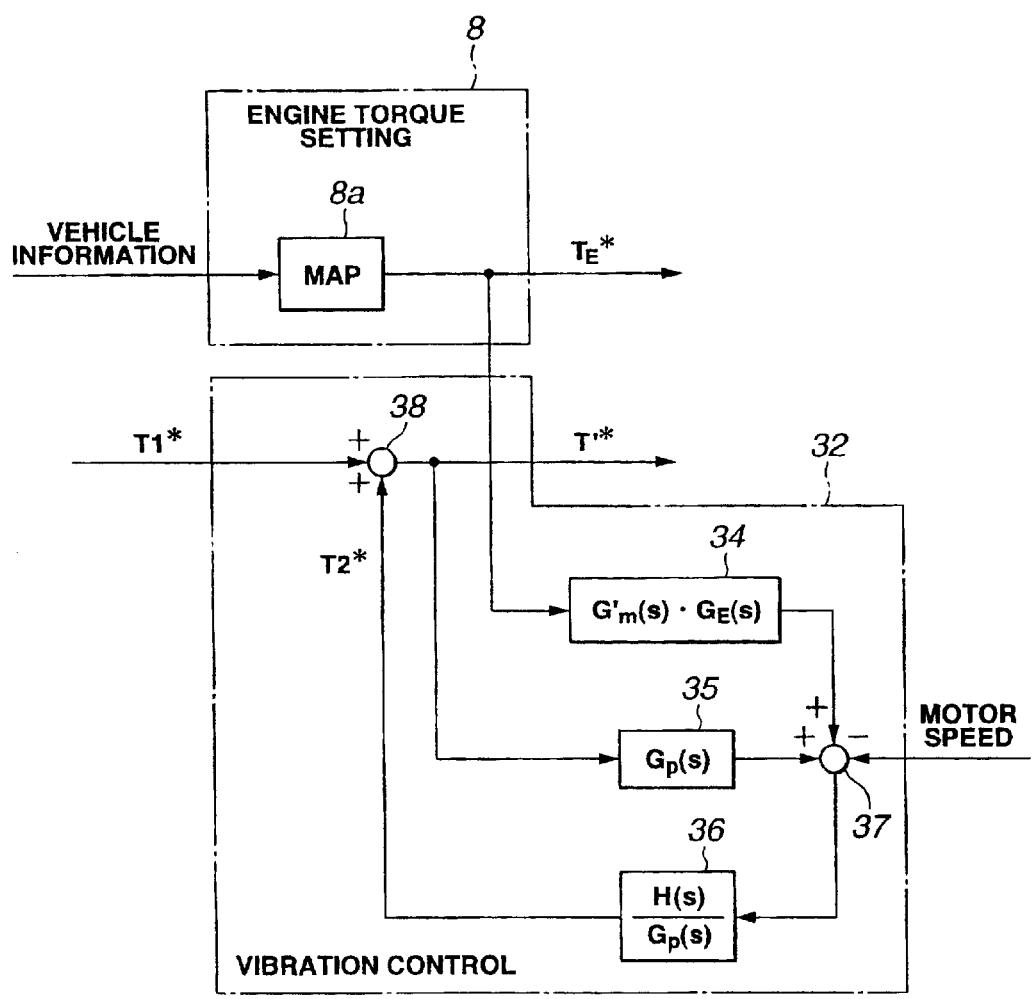
FIG. 10 is a block diagram showing an engine torque setting section and a vibration control section in the vibration control apparatus of FIG. 9.
Figure 11A:
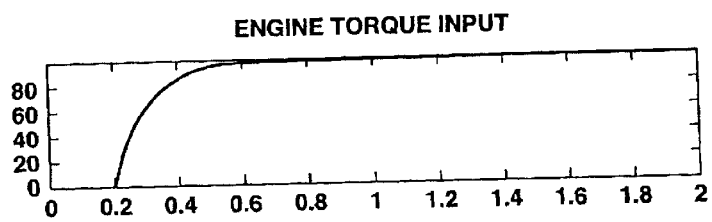
FIGS. 11A, 11B, 11C and 11D are graphs showing, respectively, engine torque input, motor torque input (feedback compensation), motor and engine angular speed, and vehicle longitudinal acceleration in the vibration control apparatus of the second embodiment.
Figure 11B:
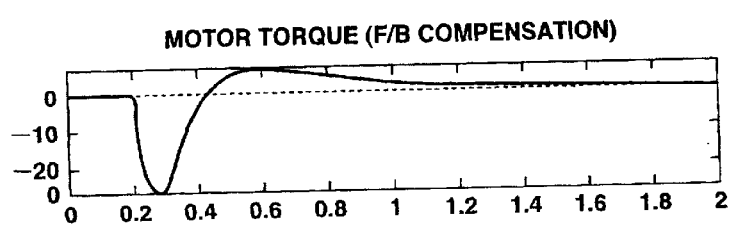
Figure 11C:
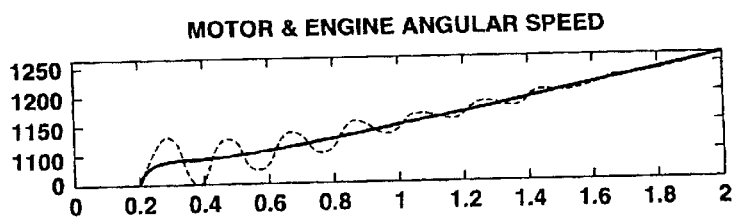
Figure 11D:
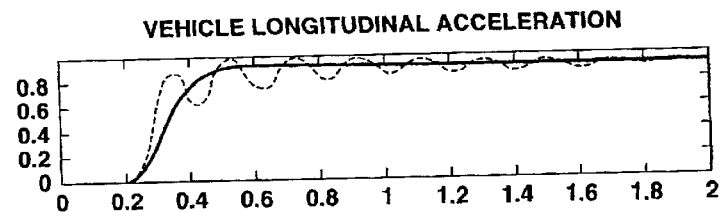

FIGS. 9 and 10 show a vibration control apparatus 31 according to a second embodiment of the present invention. Vibration control apparatus 31 is for a vehicle including, as prime mover, engine 33 and electric motor 6 (vehicle of a motor assist type). As shown in FIG. 9, vibration control apparatus 31 includes motor angle sensor 1, accelerator opening sensor 2, motor toque setting section 3, vibration control section 32 and motor torque control section 5. Vibration control apparatus 31 further includes engine torque setting section (means for setting command engine torque) 8 and engine torque control section 9.

Engine torque setting section 8 sets a command engine torque $T_E^*$ in accordance with the motor speed sensed by motor angle sensor 1 and the accelerator opening sensed by accelerator opening sensor 2.

Engine torque control section 9 controls engine 33 in accordance with command engine torque $T_E^*$ so as to bring the output torque of engine 33 to command engine torque $T_E^*$.

FIG. 10 shows more in detail engine torque setting section 8 and vibration control section 32 shown in FIG. 9. Engine torque setting section 8 includes a map 8a having a relation between the motor speed and engine output torque, for data of accelerator opening. Map 8a receives, as inputs, the speed of motor 6 and data on the accelerator opening, and delivers, as an output, the command engine torque $T_E^*$ corresponding to these inputs.

Vibration control section 32 includes three control blocks 34, 35 and 36, and two adders 37 and 38.

Control block (an engine and motor speed correcting section) 34 has a transfer characteristic G'm(s)·G$_E$(s). G'm(s) is a target response (ideal model) of the vehicle torque input and motor rotational speed. G$_E$(s) is a delay model representing a delay from the output of command engine torque T$_E$* to the generation of actual engine torque.

Control block 35 has a transfer characteristic Gp(s), and control block 36 has a transfer characteristic H(s)/Gp(s). Transfer characteristic Gp(s) is arranged to alter a parameter representing the inertia (moment of inertia) of the prime mover (engine and motor) in accordance with a connecting condition of a connecting device, such as an electromagnetic clutch, for making connection of engine, to obtain accurate vibration control performance irrespective of the connecting condition of the engine.

Adder 37 adds the output of control block 34 and the output of control block 35 together, and moreover subtract the data of the sensed actual motor speed. The resulting signal is delivered to control block 36. Adder 37 serves as summing means for algebraic sum or a deviation calculating section to determine an input quantity to be inputted to the second target torque setting section (36).

Adder 38 adds the output signal of control block 36 serving as the second target torque setting section, and the first command torque T1* supplied from motor torque setting section 3.

The thus-constructed vibration control apparatus according to the second embodiment provides vibration control performance in vehicle starting operation as in the first embodiment even in a motor assist type vehicle.

FIGS. 11A~11D show various characteristic of vibration control apparatus 31. FIGS. 11A, 11b, 11c and 11D show, respectively, time variations of engine torque input, motor torque input (feedback compensation), motor & engine angular speed and vehicle longitudinal acceleration. In these figures, broken lines show characteristic with no vibration control, and solid lines show characteristics obtained by vibration control according to the second embodiment. These characteristics reveal the effects by vibration control apparatus 31, of reducing vibrations during a vehicle starting operation.

Figure 12:
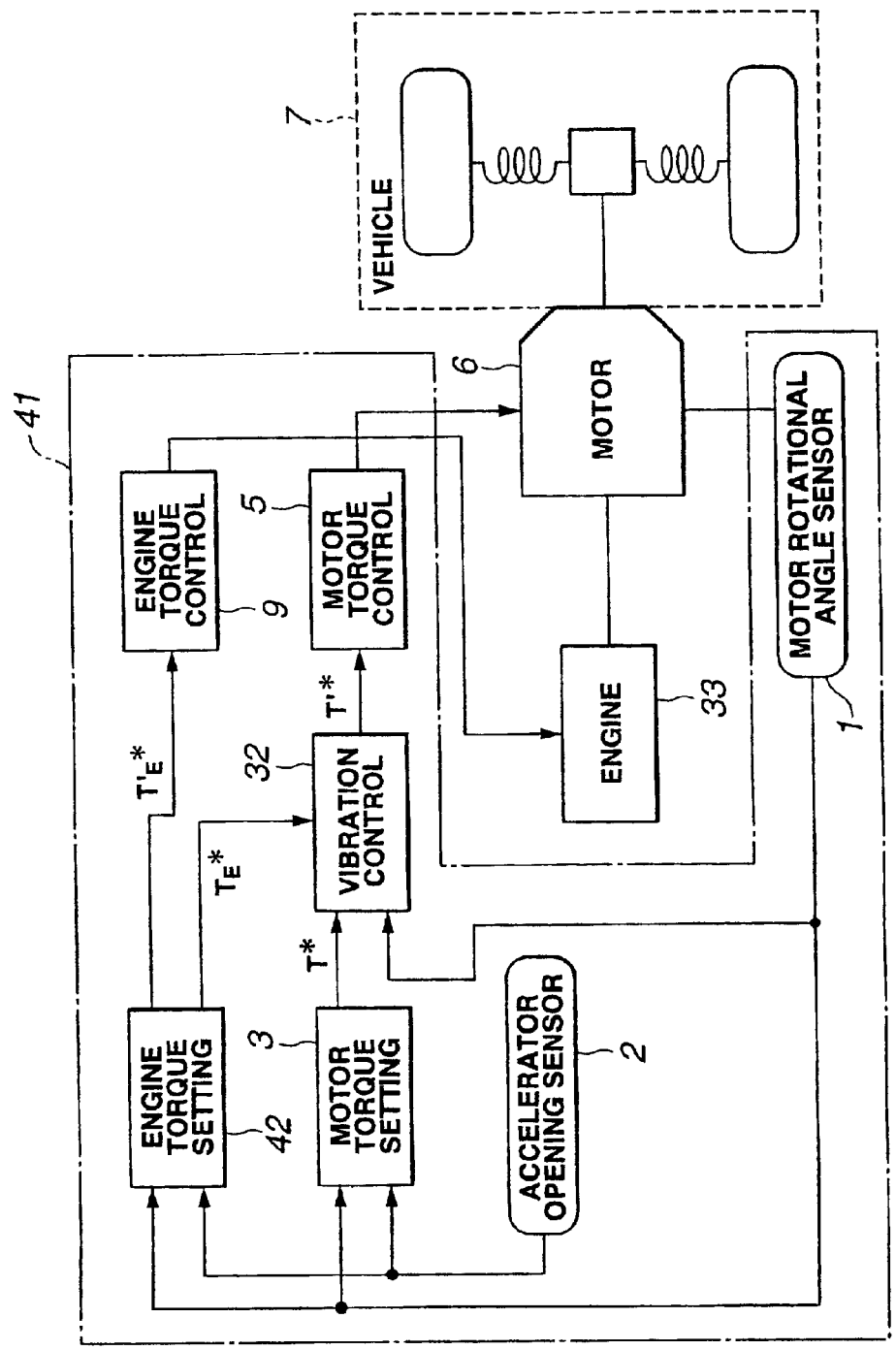
FIG. 12 is a schematic view showing a vibration control apparatus according to a third embodiment of the present invention.
Figure 13:
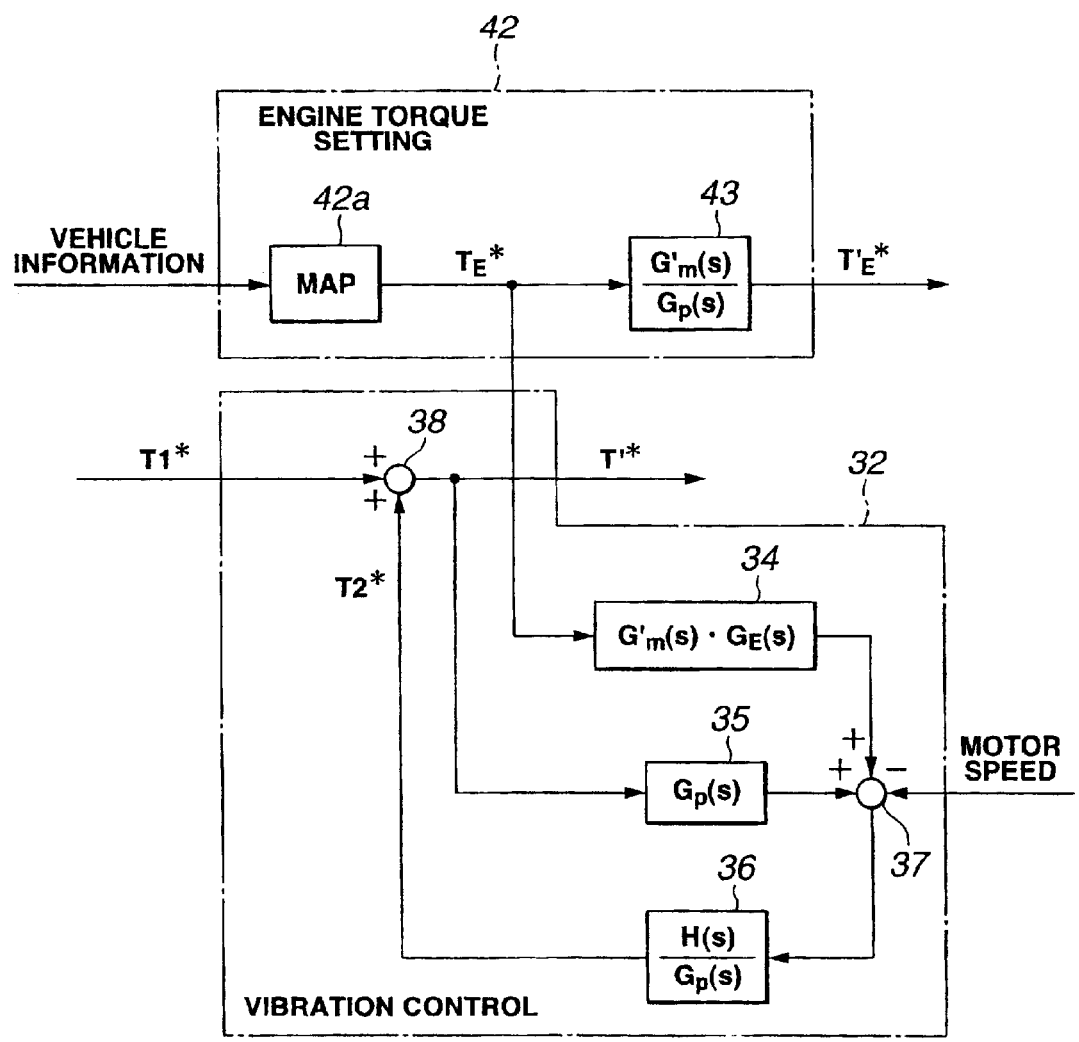
FIG. 13 is a block diagram showing an engine torque setting section and a vibration control section in the vibration control apparatus of FIG. 12.

FIGS. 12 and 13 shows a vibration control apparatus 41 according to a third embodiment of the invention. Vibration control apparatus 41 differs from vibration control apparatus 31 of the second embodiment, in an engine torque setting section 42, as shown in FIG. 13, including a map 42a and a control block 43 for modifying a command engine torque T$_E$* obtained from map 42a.

As shown in FIG. 13, engine torque setting section 42 includes a control block 43 having a transfer characteristic G'm(s)/Gp(s). This control block 43 receives command engine torque T$_E$* from map 42a and determines a modified command torque T$_E$'* by modifying command engine torque T$_E$*. Modified command torque T$_E$'* is supplied to engine 33.

The thus-constructed vibration control apparatus 41 can provide comparable effects to the second embodiment with less feedback compensation quantity though the computation load is increased, and thereby the vibration control apparatus 41 can improve the controllability.

Though the vehicle is of the motor assist type in the second and third embodiments, the present invention is applicable to vehicles of various other types. In the case of a vehicle equipped with a transmission for changing or varying the speed ratio, or a parallel hybrid vehicle having a device for connecting and disconnecting an engine, the vibration control apparatus can provide good control performance by varying or adjusting constants (Jm, N) in transfer characteristic Gp(s) (cf. equation (6)).

Figure 14A:
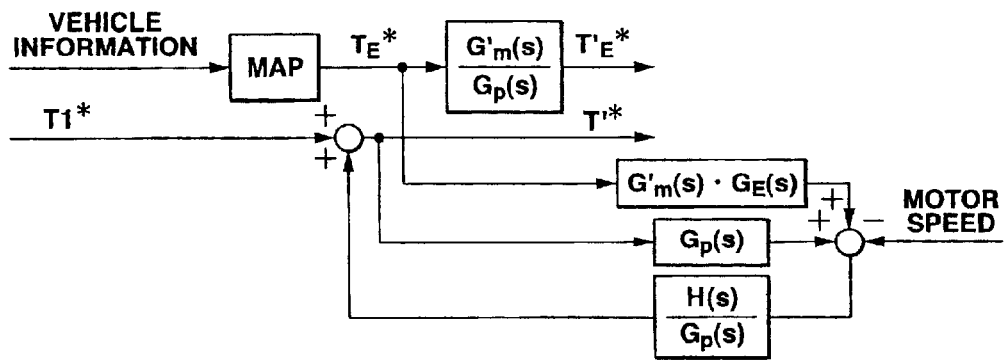
FIGS. 14A, 14B and 14C are block diagrams showing variations of the third embodiment.
Figure 14B:
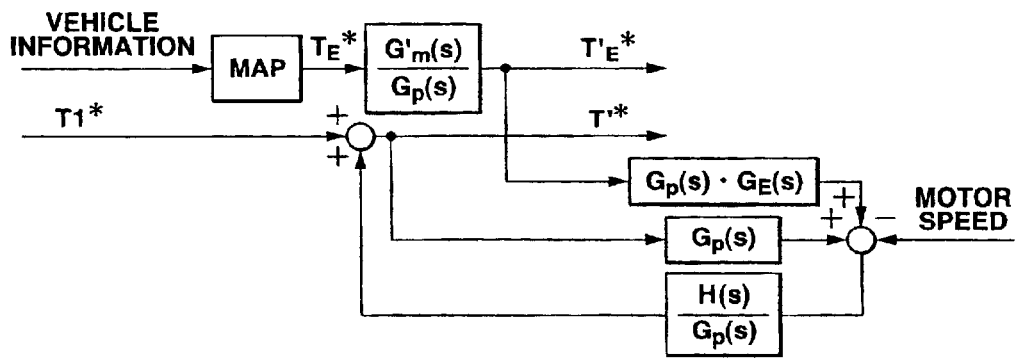
Figure 14C:
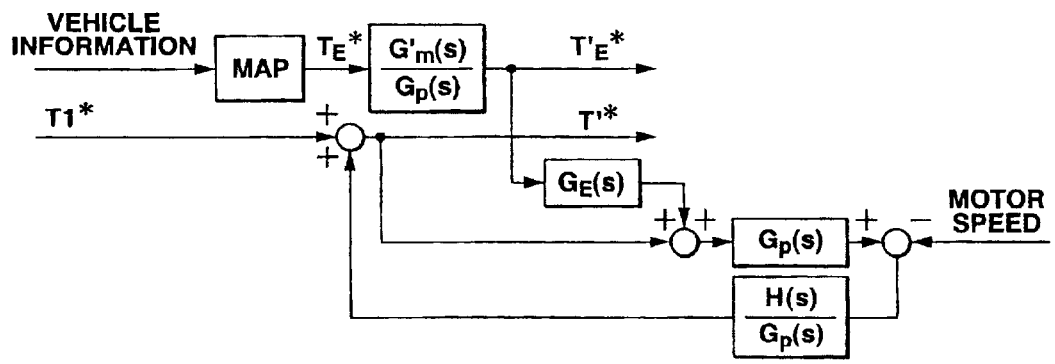

Within the concept of the present invention, there are many other conceivable applications with equivalent mathematical configurations. It is possible to employ an arrangement shown in FIG. 14A, 14B or 14C. Moreover, the present invention is not limited to numerical values employed in the illustrated examples. Values should be adjusted appropriately in accordance with the characteristic of an actual vehicle.

Figure 15:
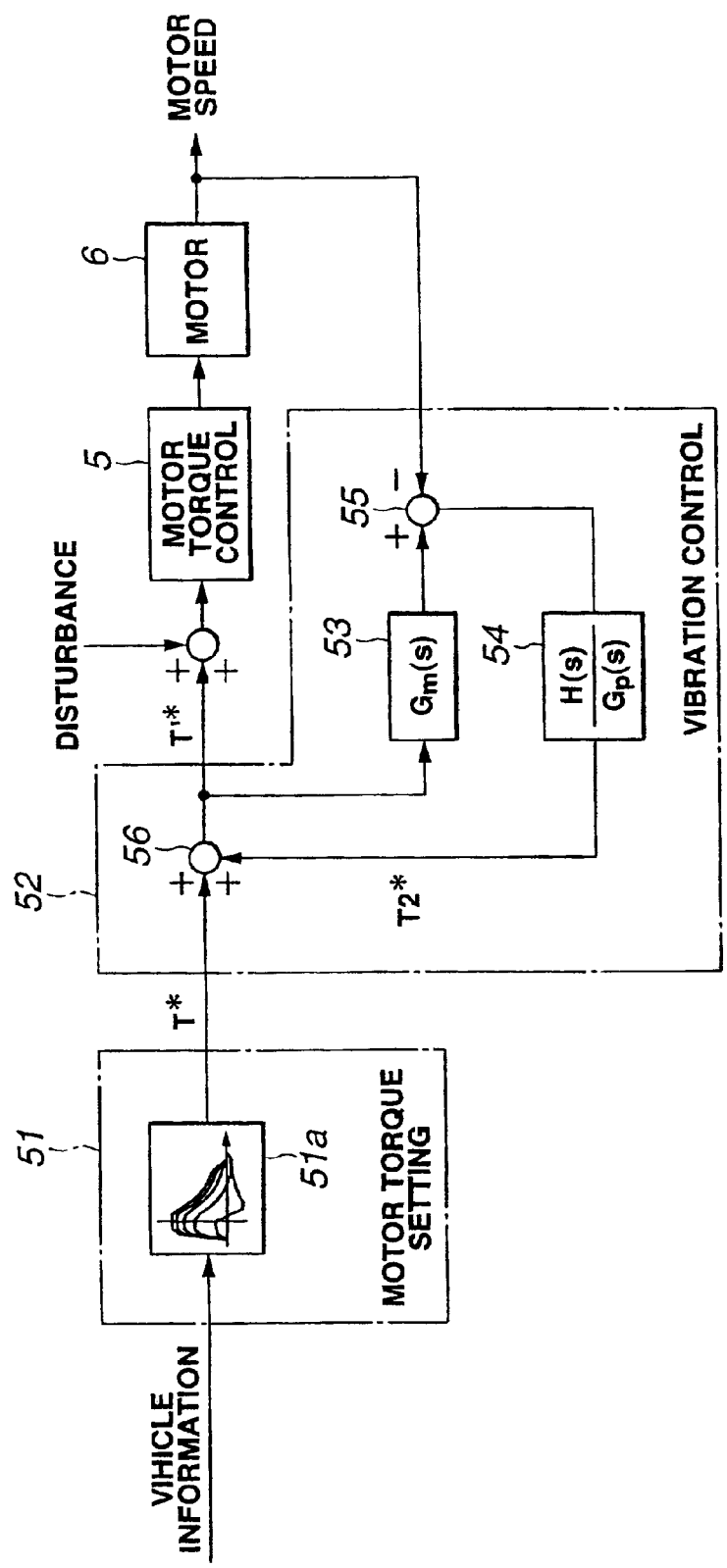
FIG. 15 is a block diagram showing a motor torque setting section and a vibration control section in a vibration control apparatus according to a fourth embodiment of the present invention.

FIG. 15 shows a part of a vibration control apparatus according to a fourth embodiment of the invention. The vibration control apparatus of the fourth embodiment is substantially identical in arrangement as a whole to the apparatus shown in FIG. 1, except for motor torque setting section 51 and vibration control section 52. FIG. 15 shows motor torque setting section 51 and vibration control section 52 according to the fourth embodiment. Motor toque setting section 51 does not have control block 12 of FIG. 2, so that the first target torque T1* outputted from motor torque setting section 51 is equal to the output of map 51a.

Vibration control section 52 includes two control blocks 53 and 54, a subtracter 55 and an adder 56. Control block 53 has a transfer characteristic Gm(s) and control block 54 has a transfer characteristic H(s)/Gp(s). Subtracter 55 calculates a deviation between the output of control block 53 and the motor speed. Adder 56 adds first target torque T1* and the output of control block 54.

The vibration control apparatus according to the fourth embodiment can restrain vibrations excited by first target torque T1* and vibrations excited by nonlinearity such as looseness or disturbance, only with the feedback control. It is possible to arrange the vibration control apparatus of the fourth embodiment so that there is further provided the engine torque setting section as in the second or third embodiment.

Section 3 or 51 can serve as first calculating means for calculating a first target torque in accordance with vehicle information on a vehicle operating condition. Sections 13, 15, 22, 23, 25, 34, 35, 36, 37, 53, 54 or 55 can serve as second calculating means for calculating a second target torque in accordance with a sensed motor speed by using a torque determining model H(s)/Gp(s) composed of a transfer characteristic H(s) which is greater than a transfer characteristic Gp(s) in an order difference between the order of a denominator and the order of a numerator. Sections 16, 24, 38 or 56 can serve as third calculating means for calculating a command motor torque from the first target torque and the second target torque. Sections 5 or 9 can serve as controlling means for controlling the electric motor to bring an actual output torque of the electric motor closer to the command motor torque. Sections 13 and/or 53 can serve as means for calculating an estimated motor speed of the electric motor from the command motor torque by using a speed estimating model (Gp(s), Gm(s)). Sections 14, 37 or 55 can serve as means for determining an input quantity from a deviation of the actual motor speed from the estimated motor speed. Sections 15, 36 or 54 can serve as means for calculating the second target torque from the input quantity by using the torque determining model H(s)/Gp(s).

This application is based on a prior Japanese Patent Application No. 2001-183519. The entire contents of the prior Japanese Patent Application No. 2001-183519 with a filing date of Jun. 18, 2001 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vibration control apparatus for a vehicle powered by an electric motor, the vibration control apparatus comprising:

a motor speed sensor to sense an actual motor speed of the electric motor;

a first target torque setting section to set a first target torque in accordance with vehicle information on a vehicle operating condition;

a motor speed estimating section which includes a filter having a model Gp(s) of a transfer characteristic between a vehicle torque input and a motor speed, and which is arranged to receive a command motor torque and to calculate an estimated motor speed of the electric motor from the command motor torque with the filter;

a deviation calculating section determining an input quantity from a deviation of the actual motor speed from the estimated motor speed;

a second target torque setting section including a filter having a model H(s)/Gp(s) composed of a transfer characteristic H(s) which is greater than or equal to the model Gp(s) in an order difference between the order of a denominator and the order of a numerator, the second target torque setting section being arranged to receive the input quantity from the deviation calculating section and to calculate, as an output quantity, a second target torque from the input quantity with the filter having the model H(s)/Gp(s);

a command torque calculating section to calculate the command motor torque by addition of the first target torque and the second target torque, and to deliver the conirnand motor torque to the motor speed estimating section; and a motor torque controlling section to control the electric motor to bring an actual output torque of the electric motor closer to the command motor torque.

2. The vibration control apparatus as claimed in claim 1, wherein the first target torque setting section comprises:

a steady target torque setting section to set a steady target torque in accordance with the vehicle information; and a target torque modifying section to receive the steady target torque and to set the first target torque by passing the steady target torque through a filter having a characteristic Gm(s)/Gp(s) composed of an ideal model Gm(s) representing a transfer characteristic between a vehicle torque input and a motor speed, and the model Gp(s).

3. The vibration control apparatus as claimed in claim 1, wherein the vibration control apparatus further comprises:

a command engine torque setting section to set, in accordance with the vehicle information, a command engine torque for an engine of the vehicle which is powered by the electric motor and the engine; and an engine and motor speed correcting section having a filter GE(s) modeled on a delay from a change in the command engine torque to a resulting change in an actual engine torque, and a transfer characteristic G'm(s) between an engine torque and an engine and motor speed, the engine and motor speed correcting section being arranged to receive the command engine torque from the command engine torque setting section and to calculate an engine and motor correction speed from the command engine torque; and wherein the deviation calculating section is configured to calculate the input quantity to the second target setting section by adding the engine and motor correction speed to the deviation of the actual motor speed from the estimated motor speed.

4. The vibration control apparatus as claimed in claim 3, further comprising:

a command engine torque modifying section to receive the command engine torque from the command engine torque setting section, and to calculate a modified command engine torque by passing the command engine torque through a filter G'm/Gp(s) composed of the transfer characteristic G'm(s) and Gp(s); and an engine controlling section to control the engine in accordance with the modified command engine torque.

5. The vibration control apparatus as claimed in claim 3, wherein the model Gp(s) includes a parameter which represents an inertia of a prime mover including the electric motor and engine and which is varied in accordance with a connecting condition of the engine in the prime mover.

6. The vibration control apparatus as claimed in claim 1, wherein the model Gp(s) includes a parameter which is varied in accordance with a speed ratio of the vehicle.

7. The vibration control apparatus as claimed in claim 1, wherein the second target torque setting section comprises a band-pass filter having the transfer characteristic H(s).

8. The vibration control apparatus as claimed in claim 7, wherein the transfer characteristic H(s) of the band-pass filter is so set that a damping characteristic on a low-pass side and a damping characteristic on a high-pass side are substantially equal to each other, and a resonance frequency of a drive system is located substantially at a middle of a pass-band of the transfer characteristic H(s).

9. The vibration control apparatus as claimed in claim 1, wherein the model Gp(s) is a mathematical model obtained by subjecting a transfer characteristic derived from an equation of motion to pole-zero cancellation.

10. The vibration control apparatus as claimed in claim 1, wherein the motor speed estimating section is connected with the command motor torque calculating section and arranged to receive the command motor torque from the command motor torque calculating section and to calculate the estimated motor speed of the electric motor from the command motor torque by using the model Gp(s) which is a mathematical model;

the deviation calculating section is connected with the motor speed sensor and the motor speed estimating section, and arranged to receive the actual motor speed from the motor speed sensor and the estimated motor speed from the motor speed estimating section;

the second target torque setting section is connected with the deviation calculating section to receive the input quantity from the deviation calculating section, and to calculate the second target torque from the Input quantity by using the model H(s)/Gp(s) which is a mathematical model; and the command torque calculating section is connected with the first target torque setting section to receive the first target torque, and connected with the second target torque setting section to receive the second target torque, and arranged to add the first and second target torques to determine the command motor torque.

11. A vibration control apparatus for a vehicle powered by an electric motor, the vibration control apparatus comprising:

a motor speed sensor to sense an actual motor speed of the electric motor;

a first target torque setting section to set a first target torque in accordance with vehicle information on a vehicle operating condition;

a motor speed calculating section which includes a filter having a desired model Gm(s) of a transfer characteristic between a vehicle torque input and a motor speed, and which is arranged to receive a command motor torque and to calculate a desired motor speed of the electric motor from the command motor torque with the filter;

a subtracting section to calculated a deviation of the actual motor speed from the desired motor speed;

a second target torque setting section including a filter having a model H(s)/Gp(s) composed of a transfer characteristic H(s) which is greater than or equal to a transfer characteristic Gp(s) in an order difference between the order of a denominator and the order of a numerator, the second target torque setting section being arranged to receive the deviation from the subtracting section and to calculate a second target torque from the deviation by using the filter having the model H(s)/Gp(s);

a command torque calculating section to calculate the command motor torque by addition of the first target torque and the second target torque, and to deliver the command motor torque to the motor speed calculating section; and a motor torque controlling section to control the electric motor to bring an actual output torque of the electric motor closer to the command motor torque.

12. A vibration control apparatus for a vehicle having a prime mover including an electric motor, the vibration control apparatus comprising:

first calculating means for calculating a first target torque in accordance with vehicle information on a vehicle operating condition;

second calculating means for calculating a second target torque in accordance with a sensed motor speed by using a torque determining model H(s)/Gp(s) composed of a transfer characteristic H(s) which is greater than a transfer characteristic Gp(s) in an order difference between the order of a denominator and the order of a numerator;

third calculating means for calculating a command motor torque from the first target torque and the second target torque; and controlling means for controlling the electric motor to bring an actual output torque of the electric motor closer to the command motor torque.

13. The vibration control apparatus as claimed in claim 12, wherein the first calculating means includes a means for calculating the first target torque in accordance with the sensed motor speed and a driver's accelerator input.

14. The vibration control apparatus as claimed in claim 12, wherein the second calculating means comprises:

means for calculating an estimated motor speed of the electric motor from the command motor torque by using a speed estimating model having a transfer characteristic between a vehicle torque input and a motor speed;

means for determining an input quantity from a deviation of the actual motor speed from the estimated motor speed; and means for calculating the second target torque from the input quantity by using the torque determining model H(s)/Gp(s).

15. A vibration control process for a vehicle having a prime mover including an electric motor, the vibration control process comprising:

calculating a first target torque in accordance with vehicle information on a vehicle operating condition;

calculating a second target torque from a sensed motor speed of the electric motor, by using a model H(s)/Gp(s) composed of a transfer characteristic H(s) which is greater than or equal to a transfer characteristic Gp(s) in an order difference between the order of a denominator and the order of a numerator; and calculating a command motor torque from the first target torque and the second target torque, to control the electric motor to bring an actual output torque of the electric motor closer to the command motor torque.

* * * * *